Nov. 22, 1966   H. SOECHTING   3,287,022
DEVICE FOR SEALING AXIALLY MOVABLE ELEMENTS
Filed Sept. 16, 1963
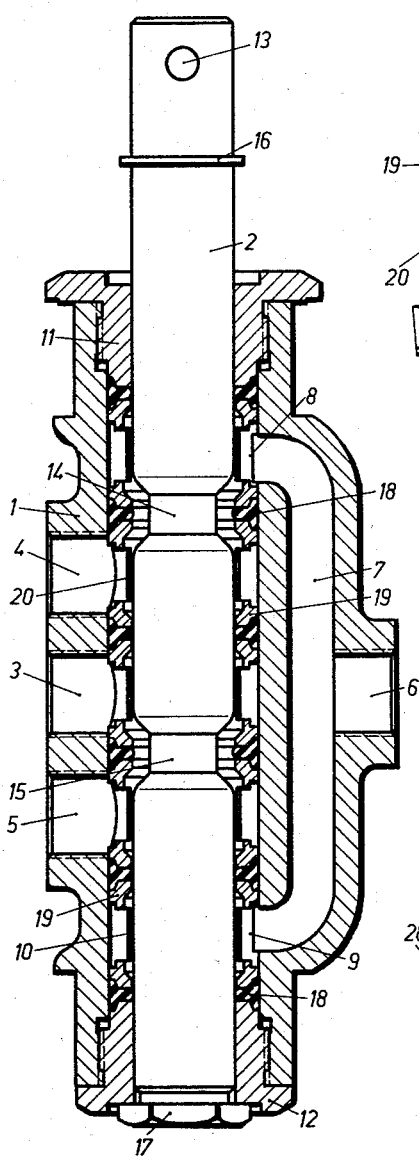
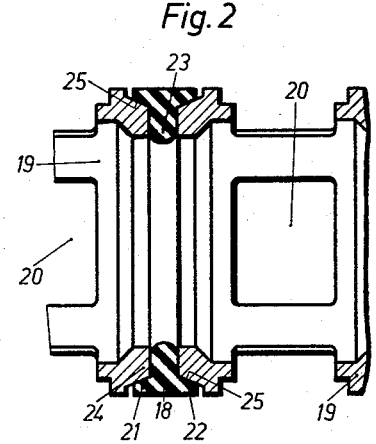
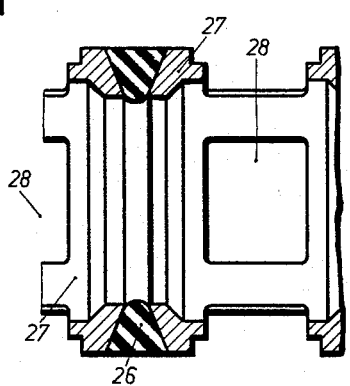
Inventor
Herbert Soechting
By
Watson, Cole, Grindle & Watson
Attys.

United States Patent Office 3,287,022
Patented Nov. 22, 1966

3,287,022
DEVICE FOR SEALING AXIALLY
MOVABLE ELEMENTS
Herbert Soechting, Vienna, Austria, assignor to Hoerbiger
Ventilwerke Aktiengesellschaft, Vienna, Austria
Filed Sept. 16, 1963, Ser. No. 309,268
Claims priority, application Austria, Sept. 25, 1962,
A 7,598/62
9 Claims. (Cl. 277—188)

The invention relates to a device for sealing axially movable elements, particularly for pneumatic or hydraulic control valves, rods and the like, comprising sealing rings made of an elastic material, abutting against the surface to be sealed and held in position by supporting elements adjacent to their front surfaces.

So far, sealing rings of an elastic material have been used for sealing control pistons, rods and the like in such cases where a special sealing could not be dispensed with altogether in view of the tight fit of the control piston in its housing, said sealing rings either presenting a circular cross-section (so-called O rings) or being provided with sealing lips which are generally in contact with the mobile part of the control element, such as the control piston or control rod. However, this type of sealing has not always proved satisfactory, especially in the presence of high pressures and major flow velocities. In particular, trouble occurred in connection with control pistons or rods presenting necked-down portions or transverse bores establishing a connection between the inlet and the outlet for the pressure medium provided on both sides of the sealing when passing over the sealing. Experience has shown that O rings generally providing a satisfactory sealing are liable to be torn out of their supports when their inner surface is no longer in close contact with the control piston, as a result of which they are squeezed, sheared or otherwise destroyed during the return stroke of the piston. This drawback is particularly frequent with sealing rings of major diameters made of relatively soft materials. It has proved impossible to eliminate the risk of O rings being torn out by providing the adjoining supporting elements with mating surfaces. On the other hand, the use of rings provided with sealing lips carries the risk of the sealing lips being overturned and thus destroyed.

The invention eliminates these difficulties by providing the preferably edged sealing rings at least on one front surface with a profile protruding in an axial direction, in which profile the supporting elements engage with a corresponding counter-profile, thereby maintaining the sealing rings in a radial direction. Furthermore, the sealing rings and the mating supporting elements can abut tightly against each other at least to some extent along their front surfaces, thereby preventing the pressure medium from penetrating the contact surfaces between the sealing rings and the supporting elements and to separate the same by shifting in an axial direction. This rugged clamping of the sealing rings definitely precludes the tearing out and consequently the destruction of the sealing rings without impairing their sealing effect. Even sealing rings of a major diameter thus designed may consist of a comparatively soft material providing a better seal. Practical tests have shown the sealing device according to the invention to be suitable also for use with control members for higher pressures and major flow velocities, in particular in view of the fact that no shortcomings will occur even with hydraulic control members producing a certain pressure-head and/or suction due to the high specific weight and the incompressibility of the pressure medium.

According to a preferred embodiment of the invention the sealing rings present an approximately T-shaped cross-section, the surfaces of the two wings of the T facing the leg being preferably of a conical shape. With this design the supporting elements tightly adjoin the radially extending even surfaces of the leg and hold the sealing ring in place in an axial direction, whereas the preferably symmetrical wings afford a secure radial hold. The wings providing a snug fit on the side facing away from the leg serve simultaneously as sealing lips. The supporting elements may be so designed as to slightly recede in the areas of the wings acting as sealing lips, so that the wings are pressed against their bearing surface by the pressure medium. However, if the surfaces of the wings adjoining the leg are of a conical design, the supporting elements may also rest against the conical surfaces with a tight fit, thereby producing an additional mechanical pressure application on the areas of the wings acting as sealing lips, a feature which is particularly advantageous in the presence of high operating pressures.

In order to obtain a positive hold in a radial direction the sealing rings may also be of a different shape. For example, they may, according to another feature of the invention, present an approximately triangular cross-section and abut with a cross-sectional edge against the surface to be sealed. This shape also assures a positive clamping of the sealing rings if the supporting elements present a corresponding counterprofile, so that the sealing rings cannot be torn out, damaged or destroyed even in the event of high operating pressures and major flow velocities. This embodiment of the invention features moreover a particularly plain cross-sectional shape of the sealing rings and of the associated counterprofiles of the supporting elements.

According to a further embodiment of the invention in the area abutting against the surface to be sealed the cross-section of the sealing rings can be rounded off, being preferably of a semi-circular shape. In that case, the sealing rings present an O ring in the area of the surface to be sealed off, thereby producing the same advantageous sealing effect.

Further details and advantages of the invention will appear from the following description of several embodiments of the invention with reference to the accompanying drawing in which:

FIG. 1 shows a longitudinal cross-section of a four-way control slide valve with a sealing according to the invention, FIG. 2 shows a cross-section through the sealing device on an enlarged scale, and FIG. 3 is a cross-sectional view of a further embodiment of the invention.

The control slide valve as illustrated in FIG. 1 comprises a valve casing 1 and a control piston 2 axially slidable therein. The valve casing 1 comprises four connecting bores, the connecting bore 3 serving for the supply of the pressure medium, the connecting bores 4 and 5 for the connection of the consuming device, such as for the two sides of a double-acting compressed-air cylinder, and finally the connecting bore 6 serving for the discharge of the pressure medium, for example into the atmosphere. The connecting bore 6 communicates via a cast-in channel 7 with the two openings 8 and 9 discharging into the bore 10 of the casing 1. On the front ends the valve casing 1 is closed by means of lids 11 and 12 serving simultaneously as a guide for the control piston 2. The control piston 2 can be displaced in an axial direction between two extreme positions by means of a mechanical, pneumatic, hydraulic or electro-magnetic actuating means (not shown) provided at one of its extremities at an appropriate cross-bore 13 and presents two necked-down portions 14 and 15 through which the connecting bores 3 to 6 are alternatingly interconnected depending on the position of the control piston 2. The two extreme positions of the control piston 2 are determined by a collar 16 abutting against the lid 11 on the one hand, and by a nut 17 located at the end of the control piston 2 and abutting against the lid 12 on the other hand.

Sealing between the valve casing 1 and the control piston 2 is provided by sealing rings 18 maintained in their relative position by supporting elements 19 and by the mating inner surfaces of the lids 11 and 12. The sealing rings 18 are made of elastic material, each being located between two adjacent connecting bores. In the area of the connecting bores 3 to 5 and of the openings 8, 9 the supporting elements 19 are provided with window-shaped recesses 20 through which the pressure medium can reach the necked-down portions 14, 15. In the extreme position of the control piston 2 shown in the drawing the connecting bore 3 communicates with the connecting bore 5 via the necked-down portion 15, while the connecting bore 4 is connected with the connecting bore 6 via the necked-down portion 14, the opening 8 and the channel 7. The opening 9 is, however, closed in this extreme position of the control piston 2. In the other extreme position of the control piston 2 a connection is provided between the connecting bores 3 and 4 on the one hand and between the connecting bores 5 and 6 on the other had.

As illustrated on a larger scale in FIG. 2, the sealing rings 18 present a T-shaped cross-section, the wings 21 and 22 of which are of a symmetrical design and adjoin the bore 10 of the casing, whereas the leg 23 protrudes inwardly in a radial direction and rests against the control piston 2. The supporting elements 19 present a projection 24 of a nose-shaped cross-section engaging in the angle formed by one of the two wings 21 or 22 and the leg 23 and positively maintain the sealing rings 18 in a radial direction, thereby definitely eliminating the risk of the sealing rings 18 being torn out of their retaining tie and squeezed, sheared off or otherwise damaged during the return motion of the control piston, especially when they are passed over by the necked-down portion 14, 15 and are not therefore, subject to wear in a radial direction.

In the embodiment shown the surface 25 of the two wings 21 and 22 of the cross-section of the sealing rings 18 facing the leg 23 are of conical design and the projections 24 of the supporting elements 19 abut tightly against the surface 25. As a result, the wings 21, 22 are firmly pressed against the bore 10 of the casing so that they act as sealing lips. However, the projections 24 may also rest snugly against the leg 23 only and recede slightly in the area of the surfaces 25 of the wings 21, 22 so that the surfaces 25 are impinged upon by the pressure medium and press the wings 21, 22 against the casing. Particularly in the latter case the surfaces 25 of the wings 21, 22 facing the leg 23 can also be of a cylindrical design. The contour line of each of the legs 23 of the sealing rings 18 adjoining the control piston is preferably rounded off so as to present a semicircular shape for example, ensuring the same satisfactory sealing effect as with the use of conventional O rings.

In the embodiment illustrated in FIG. 1 the sealing rings adjoining the lids 11 and 12 are also of a T-shaped design and positively clamped between the supporting elements 19 and the mating front surfaces of the lids 11, 12. As in that case the sealing rings are permanently supported on their internal diameter by the control piston 2 and cannot therefore, be torn out, it is also possible in these places to use sealing rings of a different design, such as O rings for example.

FIG. 3 shows a somewhat modified embodiment of the invention, the sealing ring 26 presenting an approximately triangular cross-section with one side snugly abutting against the casing and one of its edges facing the surface to be sealed. In this case too, the contours of the sealing ring assuring the sealing are rounded off. The supporting elements 27 maintaining the sealing ring 26 in position are firmly abutting against the inclined front surfaces of the sealing ring 26, so that the latter cannot be torn out even if no inner radial support is provided. The window-shaped recesses of the supporting element 27 as shown in FIG. 3 are designated by reference number 28.

The invention is not limited to the embodiments illustrated wherein the sealing rings are rigidly secured in the casing of the control piston. On the contrary, within the scope of the invention it is also possible to attach the sealing rings to the mobile portion of the control element, in which case the sealing rings presenting a T-shaped cross-section for example, adjoin the control piston with the wings of the T whereas the leg protrudes outwardly in a radial direction. Moreover, the invention is not applicable to control slide valves alone, as it can be used to advantage wherever axially displaceable elements are to be sealed off.

I claim:

1. A device for sealing axially movable elements in a housing having a member movable therein comprising, a sealing ring of elastic material of approximately T-shape in cross-section in the diametrical plane arranged to lie between and bear radially against the movable member and the housing, and annular supporting elements for axially mounting one on each side of the sealing ring to fix the sealing ring with the leg of the T projecting towards the movable member, each respective axial end face of the supporting elements contacting with the complete annular portion of the respective radial face of said leg of the sealing ring which is intermediate the radially innermost and radially outermost portions of the sealing ring 2. A device according to claim 1, in which the surfaces of the wings of the T which face the leg of the T being of conical shape.

3. A device according to claim 1, in which a tip of the leg of each T-shape is of circular cross-section.

4. A device according to claim 1, in which the valve member has at least one necked-down portion which passes through the sealing means in the operation of the valve.

5. A device for sealing axially movable elements in a housing having a member movable therein comprising, a sealing ring of elastic material of approximately solid triangular shape in cross-section in the diametrical plane arranged to lie between and bear radially against the movable member and the housing, and annular supporting elements for axially mounting one on each side of the sealing ring to fix the sealing ring with the apex of the triangle projecting towards the movable member, each respective axial end face of the supporting elements contacting with the complete annular portion of the respective radial face of the sealing ring which is intermediate the radially innermost and radially outermost portions of the sealing ring.

6. A device according to claim 5, in which the apex of the triangle is rounded off.

7. A device according to claim 5, in which the apex of the triangle is circular.

8. A device for sealing axially movable elements in a housing having a member movable therein comprising, a sealing ring of elastic material of approximately a wide portion and a narrowed leg portion in cross-section in the diametrical plane arranged to lie between and bear radially against the movable member and the housing, and annular supporting elements for axially mounting one on each side of the sealing ring to fix the sealing ring with the narrowed leg portion projecting towards the movable member, each respective axial end face of the supporting elements contacting with the complete annular portion of the respective radial face of said narrowed leg portion of the sealing ring which is intermediate the radially innermost and radially outermost portions of the sealing ring.

9. A device according to claim 8, in which the end of the narrowed leg portion is rounded off.

References Cited by the Examiner

UNITED STATES PATENTS

| | | | |
|---|---|---|---|
| 2,376,148 | 5/1945 | Johnston | 277—145 |
| 3,039,780 | 6/1962 | Nordell | 277—125 |
| 3,188,048 | 6/1965 | Sutherland | 277—117 X |
| 3,197,215 | 7/1965 | Hodge | 277—125 X |

FOREIGN PATENTS

| | | |
|---|---|---|
| 616,203 | 3/1961 | Canada. |
| 1,173,092 | 10/1958 | France. |

LAVERNE D. GEIGER, *Primary Examiner.*

J. MEDNICK, *Assistant Examiner.*